Aug. 26, 1952  E. M. BOARDMAN  2,608,601
CAPACITOR
Filed May 17, 1950  4 Sheets-Sheet 1
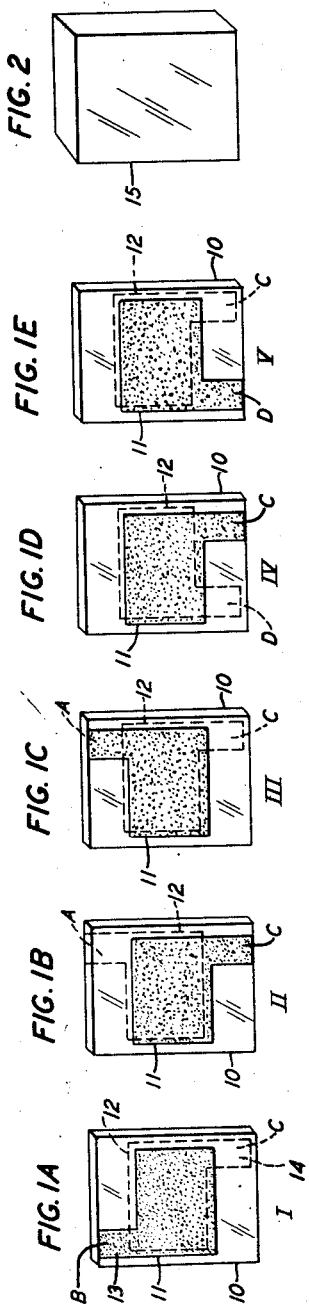
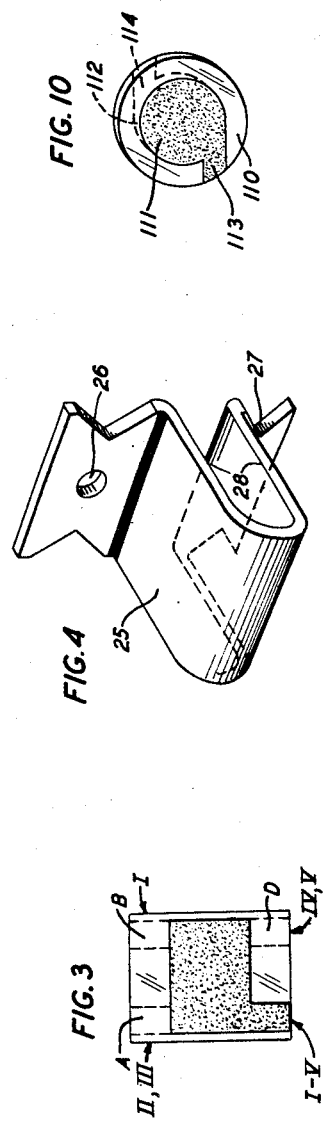
INVENTOR
E. M. BOARDMAN
BY D. Mackenzie
AGENT Aug. 26, 1952     E. M. BOARDMAN     2,608,601
CAPACITOR Filed May 17, 1950     4 Sheets-Sheet 2

INVENTOR
*E. M. BOARDMAN*
BY
AGENT

Aug. 26, 1952 E. M. BOARDMAN 2,608,601
CAPACITOR
Filed May 17, 1950 4 Sheets-Sheet 3
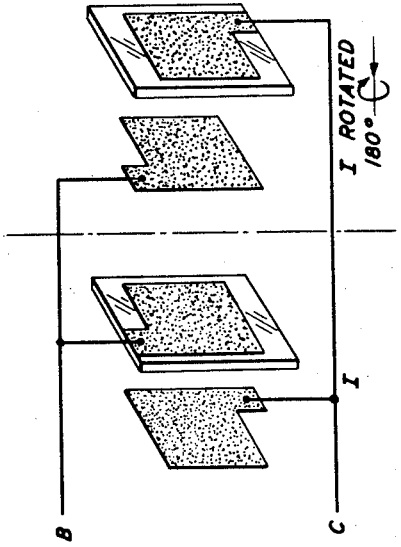
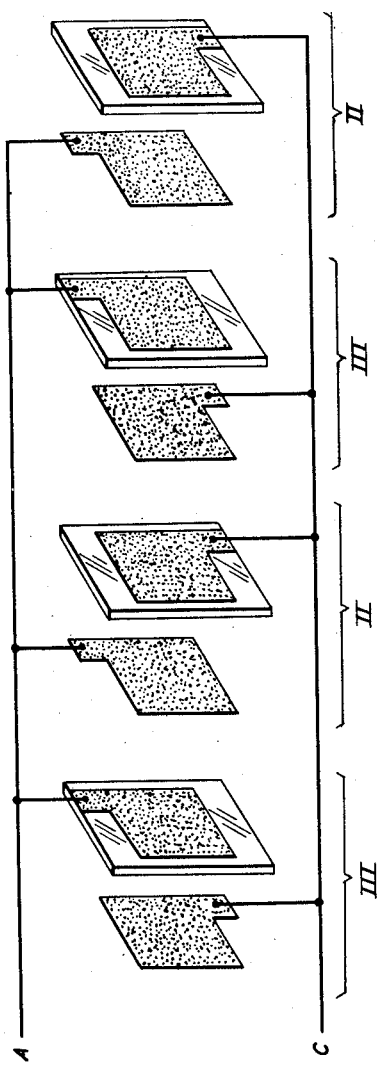
INVENTOR
E. M. BOARDMAN
BY
AGENT Aug. 26, 1952   E. M. BOARDMAN   2,608,601
CAPACITOR
Filed May 17, 1950   4 Sheets-Sheet 4
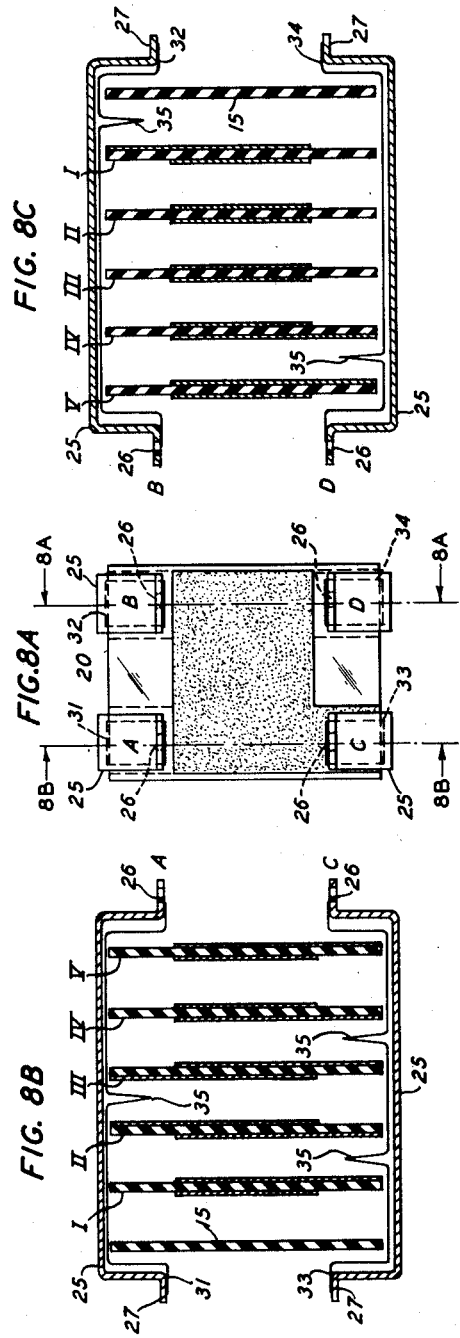
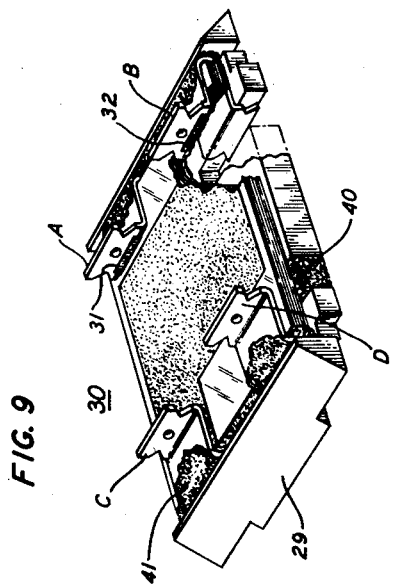
INVENTOR
E. M. BOARDMAN
BY
AGENT Patented Aug. 26, 1952

2,608,601

UNITED STATES PATENT OFFICE 2,608,601

CAPACITOR

Edward M. Boardman, Mountain Lakes, N. J., assignor to Bell Telephone Laboratories, Incorporated, New York, N. Y., a corporation of New York Application May 17, 1950, Serial No. 162,567

3 Claims. (Cl. 175—41)

This invention relates to electrical condensers, particularly to those of the type comprising laminae of a dielectric coated on each face with a film of metal.

Condensers of this type are useful in a variety of apparatus and form the subjects of numerous disclosures, among which may be mentioned United States Patents 2,224,288, December 10, 1940, to A. T. Chapman, and 2,262,791, November 18, 1941, to J. R. Bransford and A. T. Chapman. Each of these patents discloses the stacking of a number of individual condensers to provide an assembly having a capacitance which is a multiple of that of the separate components, and the Chapman patent discloses an arrangement affording two condenser assemblies in one stack with three terminals, of which one is common to the two assemblies.

The present invention provides a condenser assembly, readily put together by stacking a desired number of component condensers, affording three distinct capacitances with a common terminal, which may simultaneously operate in an electrical circuit as distinct elements thereof.

A general object of the invention is to provide in a composite condenser a choice of three distinct condensers having a common terminal.

The condenser assembly having four terminals, one common to all the component condensers and the other three variously connected, it is possible to employ the assembly as a single circuit element of a plurality of discrete capacitance values, and the provision of such a condenser assembly is another object of the invention.

The dielectric material is suitably mica, and in one practical application of the invention, it was convenient to choose the mica thickness and area of metal coating to make each coated laminae have a capacitance of about 180 micromicrofarads. Various combinations of laminae may then be made. Mechanical, electrical and space requirements dictate the thickness and area in any particular case.

It is accordingly another object of the invention to provide a mica condenser network of compact form and simple construction.

In one embodiment of the present invention, there is used a sheet of mica or other dielectric material, for example of rectangular form, and coated on each of its faces with a film of conducting material, gold or silver, for example. The contours of the coatings for rectangular laminae are in each case a rectangle of which the long side parallels the short side of the dielectric sheet which is extended near one corner in a rectangular tab parallel to the long side of the sheet and reaching to its short edge. Except at this short edge, the coating terminates inside the edges of the sheet. The tabs of the coatings on opposite faces of each sheet extend toward different corners of the same or of the opposite edges. Such combinations of opposite coatings may be of several kinds, five kinds being exemplary. Of these five, one has the extensions diagonally opposite, two have them opposite along a long edge of the sheet, and in two the extensions are opposite along a short edge of the sheet; no rotation of any one will make it a duplicate of any other, and only in the case of the diagonally opposite extensions will 180-degree rotation of the sheet in its own plane leave its appearance unchanged, a transparent dielectric sheet being assumed.

Thus, in one aspect the invention provides an electrical condenser comprising a lamina of dielectric material coated on each face with a conducting film, the film being restricted in area to lie wholly within the limits of the lamina except where an extension reaches one edge of the same near one region thereof, opposite regions being approached by the extensions of the films on the two faces. As will appear, the laminae are not restricted to the rectangular contour.

Because of the diverse combinations of coating shapes, it is possible to stack a plurality of the condensers of the invention in a way to multiply to any desired extent the capacitance of an individual condenser. Indiscriminate stacking is not feasible, for the reason that the juxtaposed coatings of any two condensers in a stack must have coincident contours for the sake of facilitating the required connections to terminal strips. Such strips may be strips of foil, preferably of the same metal as the coatings, with loops intercolated between juxtaposed tabs of the stack, substantially as illustrated in Figs. 2 and 3 of Chapman Patent 2,224,288.

Thus, in another aspect the invention provides such a variety of combinations of metallic coatings on the opposite faces of dielectric laminae as to permit the stacking of a plurality of the condensers so formed, with a maximum facility of electrical connections therebetween.

Other objects and features of the condensers of the invention will become apparent from the following description of the individual unit condensers used in a specific case and of an illustrative stacking of them, read with reference to the accompanying drawings, in which:

Figs. 1A–1E exhibit in perspective condensers of the five types of coating pairs;

Fig. 2 is a perspective showing of the backing plate on which the condensers are stacked;

Fig. 3 is a top view of the assembled stack;

Fig. 4 is a perspective view, to an enlarged scale, of a clamp for binding the stack;

Fig. 7A is an exploded perspective showing of two type I condensers in parallel;

Fig. 7B is an exploded perspective showing of the parallel connection of condensers of types II and III in alternation;

Figs. 8A–8C show a plan view of the stack of Fig. 3 with terminals, and views of the two sides of the stack, rotated in opposite senses into the same plane as the plan view;

Fig. 9 is a perspective view of the assembly of Figs. 5 and 8 as mounted for use; and Fig. 10 illustrates a circular condenser of type I character.

Figure 5:
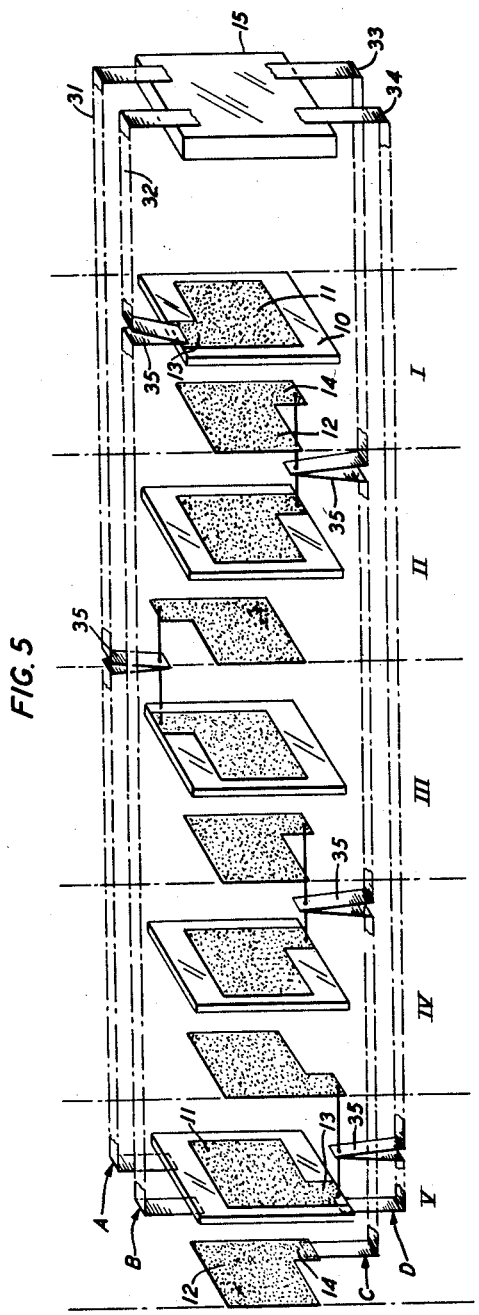
Fig. 5 is an exploded perspective showing of a typical assembly.

In the drawings, thicknesses are greatly exaggerated in relation to other dimensions.

Referring to Figs. 1A to 1E, inclusive, a rectangular lamina 10 of mica or other suitable dielectric material is coated on each face with a thin conducting film deposited by electrodeposition, precipitation, or other convenient process. In a particular application, the capacitance desired for each condenser is about 180 micromicrofarads. For this value, suitable dimensions for mica laminae 10 are: width 0.562 inch, length 0.688 inch, thickness 0.0015 inch. The conducting coating, silver or gold, as preferred, may be 0.0001 inch thick.

Referring particularly to Fig. 1A, the coatings 11 on the front face (as shown in the drawing) and 12 on the back face are rectangles $\frac{5}{16}$ inch wide parallel to the long side of lamina 10 and ½ inch long parallel to the width of the lamina. At the upper left, coating 11 is extended at 13 to reach the upper edge of lamina 10, while coating 12 is similarly extended at 14 to reach the lower edge of the lamina. It will be observed that the extensions are diagonally opposite each other, as seen looking through the lamina. This type of coating pair is designated I. The extended portion of each coating is $\frac{3}{32}$ inch wide (parallel to the short side of lamina 10); its outer edge, parallel to the long side, is continuous with the corresponding edge of coating 11, or 12 as the case may be, and extends $\frac{3}{16}$ inch to reach the edge of the lamina at its short side. At each long side of the lamina, there is an uncoated strip $\frac{1}{32}$ inch in width.

Similar coatings are applied to the laminae of Figs. 1B to 1E, inclusive, the types of coating pairs being designated II, III, IV, and V, respectively. It will be noted that in Fig. 1B, the front and back extensions reach the upper and lower short sides of the lamina at lower and upper right, respectively, looking toward the face of the condenser. In Fig. 1C, the corresponding extensions are toward upper and lower right, respectively. In Figs. 1D and 1E, the extensions are toward lower right and lower left and toward lower left and lower right, respectively, always considering the front coating to be that shown in full outline, the back coating being of dashed outline. The coating limits are determined by suitable masks in any known manner.

In combining these types of coating pairs to obtain a condenser stack, a condenser of type I may be rotated 180 degrees in its own plane and placed beneath another type I condenser oriented as shown in Fig. 1A. A condenser of type II may be rotated 180 degrees about an axis parallel to its width and placed above a condenser of type III, or may be without rotation placed beneath the latter. A type IV condenser may be placed beneath one of type V or may be rotated 180 degrees about an axis parallel to its length and thus be placed above the type V condenser. In each case, the juxtaposed coatings will fit each other, and between a terminal connected to their extensions and a terminal connected to the extensions of the external coatings, there will be twice the capacitance of each condenser separately. Other combinations are possible subject to the requirement that the faced coatings shall be in contact over the whole area of each.

The duplication of type I condensers is shown in exploded perspective in Fig. 7A. The duplication of a combination of type II and type III condensers is similarly shown in Fig. 7B. Other arrangements to provide multiple capacitances will be obvious. It will suffice here to describe the stacking of one condenser of each type in a manner appropriate to provide a choice of three distinct capacitances between a common terminal and one or another of three other terminals.

A base of mica or other suitable dielectric material is required for such a stack. As shown in Fig. 2, the base preferred is a rectangular mica slab 15 of the same width and length as the laminae 10, but some 8 mils thick.

A preferred sequence of assembly is to place the front face of the type I condenser of Fig. 1A in contact with the front face of slab 15. The condenser shown in Fig. 1A is thus turned about its long side and laid on slab 15. The condenser of type II is similarly turned and laid on the type I condenser so that the front face (as shown) of the type I is adjacent the front face of slab 15 and the front face of the type II is adjacent the back of the type I. A like procedure applies types III, IV, and V in succession. Interleaved connecting strips, as later described, make appropriate connections of the several coating extensions. In Figs. 1A to 1E and Fig. 2, the letters A, B, C, and D indicate the terminal connections of the extensions and their relation to the back plate, slab 15.

Fig. 3 shows the appearance of the assembled stack 20, looking through condensers of Figs. 1A to 1E (in reverse order) toward slab 15. With a transparent dielectric in each capacitance unit, coating extensions will be visible at all four corners of the stack. As indicated, terminals A to D make contacts as follows: A with II and III; B with I; C with I to V; D with IV and V.

Fig. 4 is a perspective view of a clamp 25, one of four such which are crimped about the four corners of the stack of Fig. 3, binding together the component condensers and making contact with the strips which at each corner serve to interconnect the appropriate coating extensions. External connections are made as by soldering at apertures such as 26. Extension 27 is provided for anchoring the completed stack in a mounting plate, as will be described in connection with Fig. 9. Clamp 25 is suitably of tinned copper, 15 mils thick, 0.156 inch wide and of length sufficient to embrace between portions 28 whatever number of component condensers it is desired to stack. For laminae of the dimensions given, a suitable distance between the face of the clamp and the vertex of the curved portion is 0.161 inch.

Referring now to Fig. 5, it will be seen how condensers I to V are mutually related and interconnected when stacked above base 15. For each condenser, coating 11 is shown in contact with lamina 10, coating 12 is represented as removed from the lamina to exhibit more clearly the registration of the several conducting films. Silver or other tapes 31—34 are suitably used to connect the appropriate films of silver or other metal on the individual unit condensers. These tapes are preferably ⅛ inch wide and 1 mil thick, and at one end (the right in Fig. 5) each overlaps the bottom of base slab 15. The length of each tape depends on the number of unit condensers in the stack and on how many interleaving loops, such as 35, are introduced. Tapes 31—34 respectively are at the left in Fig. 5 soldered to four clamps 25, not shown in this figure, which afford terminals A to D, the common terminal being C. The loops extend ⅛ inch inward from the edges of the mica sheets.

Inspection of Fig. 5 shows tape 31 ending on the outside of base 15 and (for terminal A) on an uncoated area of the mica lamina of condenser V, with a loop 35 between condensers II and III. Similar interleaved portions of tape 33 connect adjacent coatings of condensers I and II and III and IV; tape 33 ends in contact with extension 14 on condenser V for terminal C. Tape 32 is looped between base 15 and extension 13 of coating 11 on condenser I; it extends to end on the same uncoated area of condenser V as does tape 31, but near the opposite corner of the mica lamina. Finally, tape 34 extends from the bottom of slab 15 to an uncoated area of condenser V diagonally opposite the end of tape 31 and on the same side of lamina 10, with a portion 35 looped between condensers IV and V; the end of condenser V is connected to terminal D.

The stack of Figs. 3 and 5, seen from above (that is, looking from left to right in the latter figure), thus shows tapes 31 and 32 ending on the uncoated upper area of condenser V, tape 33 ending in contact with extension 14 of condenser V and tape 34 ending on the uncoated lower area of that condenser on the same side as tape 33 but near the lower corner opposite extension 14.

Tapes 31 and 33 of Fig. 5 are the severed halves of a single tape over the lengthwise center of which slab 15 has been laid in beginning the assembly of the stack; the like is true of tapes 32 and 34. When the assembly is completed and clamps 25 crimped over the stack, the tapes are cut below slab 15 and the ends shown in Fig. 5 are soldered to the appropriate clamps.

Figure 6:
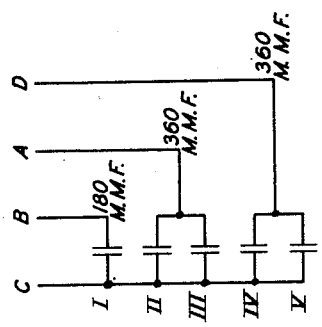
Fig. 6 is a schematic diagram of the electrical connections of the condensers of Fig. 5.

Assuming each unit condenser to be of capacitance 180 micromicrofarads, Fig. 6 shows diagrammatically the connections made by the tapes of Fig. 5. In Fig. 6, it is apparent that terminal C may be grounded, in which case terminals A, B and D afford capacitances to ground of, respectively, 180, 360, and 360 micromicrofarads. Three independent condensers are thus presented, with a common ground. If independent capacitances are not required, a variety of other capacitance values may be had: for example, connecting together terminals A, B and D, one obtains a capacitance of 900 micromicrofarads between these connected terminals and terminal C.

Figs. 7A and 7B show, respectively, how a capacitance of 360 micromicrofarads may be obtained from two type I condensers and how twice this capacitance is obtained from two groups each comprising a type II and a type III condenser, in arrangements which may enter into such an assembly as that of Fig. 5. The total capacitance of the stack may thus be increased as far as mechanical stability can be preserved.

In Figs. 8A to 8C are schematic views of the completed stack of Fig. 5 with clamps 25 applied. A plan view similar to that of Fig. 3 is shown in Fig. 8A with inclusion of clamps 25 and tapes 31—34. Fig. 8B is a view of the left side of the stack, rotated about the line A—C into the plane of Fig. 8A, while Fig. 8C is a similar view of the right side rotated oppositely to Fig. 8B and about the line B—D into the same plane. Tapes 31—34 and the edge views of condensers I—V are greatly exaggerated in thickness. The tapes for loops 35, as shown in Figs. 8B and 8C, as follows: 31 between II and III, 33 between I and II and between III and IV, 32 between I and slab 15, 34 between IV and V. Tape 33 makes contact also with V at terminal C. In actual assembly, the coatings of successive condensers are in contact, not spaced apart as might appear.

To assemble the stack of Fig. 8A, two tapes, of width and thickness as stated and of length corresponding to the number of component condensers, are laid on a stacking jig (not shown) at a suitable distance apart in lines parallel to the long sides of the stack to be assembled.

Slab 15 is then laid over the mid portion of the tapes with its long side parallel to their length. One of these tapes, later to become 32, 34, is then folded into a loop 35 over the B corner of 15, and condenser I is laid on slab 15 and this loop, coating 11 (Figs. 1A and 5) facing the upper surface of the slab and extension 13 in contact with the loop. The other tape (31, 33) is then formed into a loop at the C corner in contact with extension 14 of coating 12 of condenser I. Condenser II is laid on condenser I, as indicated in Fig. 5, including between them the loop just mentioned in contact with the extensions of the juxtaposed coatings. Continuing this process, loops are formed as shown in Figs. 5, 8B, and 8C between consecutively laid condensers III, IV, and V, care being taken that the loops shall not extend at sides or ends beyond the coating extensions to be connected.

The stack is thus assembled as if the exploded view of Fig. 5 were collapsed from left to right. At corners A—D, clamps 25 are crimped over the assembly, the tapes are cut below slab 15, and the ends of their severed portions are soldered to the respective extensions 27. The other ends of the tapes are soldered to the corresponding clamps near apertures 26, and at each end the excess tape is trimmed off. The stack is then placed in a dessicator awaiting measurements of capacitances between C and the three other terminals. Excess capacitance can, as is well known, be corrected by scraping off part of the exposed coating 12 of condenser V.

After adjustment, if required, of capacitance, the assembly is cemented into a mounting plate provided with slots to accommodate extensions 27 of clamps 25. Fig. 9 is a perspective view of the mounted stack, indicated generally by numeral 30. Mounting plate 29 is suitably of Lucite, and is placed in a mold (not shown) providing for applying methyl methacrylate cement to fill the slots 40 into which extensions 27 are inserted. The cement is also applied around and over the terminals as indicated at 41, avoiding the coatings and connecting tapes.

The assembly and mold are then baked in an air-tight container for 18 to 24 hours in an oven heated to 150 to 160° F.

Other dielectrics than mica may be used, and the coatings may be of any conducting material. Obviously, the laminae and their coatings may be other than rectangular in shape, for example, circular, as illustrated in Fig. 10. Here circular lamina 110 with circular coatings 111 and 112 on its front and back faces and extended into tabs 113 and 114, respectively, is a condenser equivalent to that shown in Fig. 1A but of alternative shape. Extensions 113 and 114 may be radial or tangential, as shown. The other condenser types, Figs. 1B to 1E may likewise be of circular form.

The size and number of tabs as well as the shape of the condenser units may differ from the showing of Figs. 1A to 1E. Applying known formulae, one may design condensers of greater or less capacitance than those shown by way of illustration in the foregoing description of a particular embodiment of the invention. Besides, a series connection of condenser units may be used by obvious rearrangement of the tapes, in place of the illustrative parallel connection described.

What is claimed is:

1. An electrical capacitor assembly comprising at least five capacitance units of individual types stacked to provide four terminals, each unit comprising a dielectric lamination having on each surface a conducting coating less in area than the lamination and extending to an edge of the lamination over one and over another of four distinct quadrants of the lamination, the extensions being parallel to the same diameter in all laminations, the units being stacked to align the extensions of adjacent coatings on superposed laminations, a conducting tape interleaved outside the stack and among the coating extensions at each segment, one tape making contact with one extension of each unit, a second tape making contact with the other extensions of units of the first type, a third tape making contact with the other extensions of units of the second and third types, a fourth tape making contact with the other extensions of units of the fourth and fifth types and a conducting terminal strip embracing the ends of each tape outside the stack.

2. An electrical capacitor assembly as in claim 1 in which the opposed coatings of each lamination of the several types are extended in quadrants of the laminations respectively: for the first type, in the second and fourth; for the second type, in the fourth and first; for the third type, in the first and fourth; for the fourth type, in the fourth and third; and for the fifth type, in the third and fourth, the quadrants being counted counterclockwise from the base of the stack.

3. An electrical capacitor assembly as in claim 2 in which the four tapes are interleaved among the extensions respectively: the one, in the fourth quadrant; the second, in the second quadrant; the third, in the first quadrant; and the fourth, in the third quadrant.

EDWARD M. BOARDMAN.

REFERENCES CITED

The following references are of record in the file of this patent:

UNITED STATES PATENTS

| Number | Name | Date |
|---|---|---|
| 1,350,279 | Howe | Aug. 17, 1920 |
| 2,157,715 | Meggenhofen | May 9, 1939 |
| 2,262,791 | Bransford | Nov. 18, 1941 |

FOREIGN PATENTS

| Number | Country | Date |
|---|---|---|
| 314,167 | Great Britain | June 27, 1929 |
| 474,754 | Great Britain | Nov. 5, 1937 |
| 654,164 | Germany | Dec. 15, 1937 |